US007245938B2

(12) United States Patent
Sobczak et al.

(10) Patent No.: US 7,245,938 B2
(45) Date of Patent: Jul. 17, 2007

(54) WIRELESS ANTENNA TRAFFIC MATRIX

(76) Inventors: David M. Sobczak, 7517 Days Woods Ct., Kingsville, MD (US) 21087; Abdelaziz Benalla, 2222 Cedar Barn Way, Baltimore, MD (US) 21244; Gregory Case, 412 Boyd Dr., Red Lion, PA (US) 17536

( * ) Notice: Subject to any disclaimer, the term of this patent is extended or adjusted under 35 U.S.C. 154(b) by 350 days.

(21) Appl. No.: 10/967,474

(22) Filed: Oct. 18, 2004

(65) Prior Publication Data

US 2005/0085270 A1 Apr. 21, 2005

Related U.S. Application Data

(60) Provisional application No. 60/512,390, filed on Oct. 17, 2003.

(51) Int. Cl.
*H04M 1/00* (2006.01)
*H04B 1/38* (2006.01)

(52) U.S. Cl. .............................. 455/562.1; 455/575.7; 455/103; 455/63.4; 455/277.2; 375/147; 375/347; 342/373; 343/890

(58) Field of Classification Search ............. 455/562.1, 455/561, 277.2, 103, 63.4, 575.7; 375/347
See application file for complete search history.

(56) References Cited

U.S. PATENT DOCUMENTS

| | | | | |
|---|---|---|---|---|
| 5,924,020 | A * | 7/1999 | Forssen et al. | 455/129 |
| 5,987,037 | A * | 11/1999 | Gans | 370/480 |
| 6,134,261 | A * | 10/2000 | Ryan | 375/141 |
| 6,330,460 | B1 * | 12/2001 | Wong et al. | 455/562.1 |
| 6,453,177 | B1 * | 9/2002 | Wong et al. | 455/562.1 |
| 6,597,927 | B1 * | 7/2003 | Eswara et al. | 455/562.1 |
| 6,728,554 | B1 * | 4/2004 | Wegner | 455/562.1 |
| 6,757,553 | B1 * | 6/2004 | English | 455/562.1 |
| 6,823,180 | B2 * | 11/2004 | Reed et al. | 455/305 |
| 6,901,062 | B2 * | 5/2005 | Scherzer et al. | 370/335 |
| 6,917,337 | B2 * | 7/2005 | Iida et al. | 343/702 |
| 7,054,664 | B2 * | 5/2006 | Nagaraj | 455/562.1 |
| 7,079,809 | B1 * | 7/2006 | Scherzer | 455/39 |

* cited by examiner

*Primary Examiner*—Marceau Milord
(74) *Attorney, Agent, or Firm*—Ober / Kaler; Royal W. Craig

(57) ABSTRACT

A beam shaping antenna matrix for use in wireless cell towers that is manually-configured at a patch panel by a wireless operator based on selection of a desired beam size and point of direction. The traffic matrix allows a wireless operator to sculpt and resculpt the beams to accommodate demographic or other changes preferably without a large amount of hardware or intensive processing capability.

17 Claims, 7 Drawing Sheets

WIRELESS ANTENNA TRAFFIC MATRIX

CROSS-REFERENCE TO RELATED APPLICATIONS

The present application derives priority from U.S. Provisional Application Ser. No. 60/512,390 filed: Oct. 17, 2003.

BACKGROUND OF THE INVENTION

1. Field of the Invention

The present invention relates to antennas for use in a wireless communications systems and, more particularly, to a simplified traffic matrix for balancing wireless traffic at an antenna station.

2. Description of the Background

Typical wireless systems divide geographical areas into a plurality of adjoining cells, and each cell is provided with a wireless cell tower. The frequency band within which wireless radio systems operate is limited in band width, and so available carrier frequencies must be used efficiently in order to provide sufficient user capacity in the system.

One solution to increase call carrying capacity is to create more cells of smaller area, and/or add more carriers to existing cells. However, creation of new cells involves increased equipment and real estate procurement costs for more sites. This can be an unduly expensive proposition. It can be far more economical to solve the problem with better antennas and traffic management.

Typical existing systems increase carrying capacity through the addition of digital carriers. For this, each cell is sectorized into nominal 120 degree angular sectors. Each 120 degree sector is served by multiple antenna elements spaced apart from each other. The use of multiple antennas is known as "diversity" and it solves the problem wherein a given antenna does cannot always see its intended signal (such as around high-rise buildings). A diversity antenna array helps to increase coverage as well as to overcome fading. When one antenna is fading and receiving a weak signal, another of the antennas is receiving a stronger signal. For example, on a typical uplink each antenna has a 120 degree wide beam of high gain sensitivity from which it picks up signals from mobile stations within a zone covered by the beam. The coverage of antenna elements overlap, so that a signal transmitted by a mobile station (MS) within a zone may be received by two or more antenna elements. Multiple antennas ensure the integrity of the transmission and reception.

"Beam shaping" is another tactic used in diversity antenna arrays which allows operators to optimize capacity, providing the most available carrier frequencies in sectors which need it most. User demographics may change to the point where the base transceiver stations have insufficient capacity to deal with demand from a localized area. For example, a new housing development within a cell may increase demand within that specific area. Beam shaping can solve this problem by distributing the traffic among the transceivers.

Prior art beam shaping solutions utilize complex beam-forming devices (LPAs, controllable phase shifters, etc.), many of which are not well suited for deployment at a masthead or tower-top with an antenna array. For example, existing adaptive arrays provide steerable antenna beams that may be controlled to individually point at a current mobile position, and these can be used to customize coverage within a cell to avoid the disadvantages associated with fixed antenna beams. ArrayComm is marketing its adaptive array antennas for use over Personal Handyphone System (PHS) networks in Asia and Latin America. Metawave is also selling beam-switching antennas for use over AMPS and CDMA networks. Metawave's SpotLight® system intelligently switches between 12 directional antennas -- each with a fixed, 30-degree beam. However, this use of computer-driven adaptive array antennas generally requires the real time determination of complex traffic weighting information (to determine demand within the area of coverage of the cell tower) as well as a plan to allocate the traffic among the available antenna transmitters/receivers. The determination of such weighting information and its use generally requires substantial processing resources to provide real time antenna beam steering and can result in signal processing delays or other undesired consequences. Other beam-forming devices use RF switches, LPA phase shifters, and complex software to form a beam that an operator pre-selects. All such highly-complex equipment is very prone to failure, a intolerant situation for wireless providers.

It would be much more desirable to eliminate the processing overhead and provide a means to allow manual sculpting of the beams to accommodate demographic or other changes. Accordingly, a need in the art exists for a system and method adapted to control the transmission and/or reception of signals that avoids the need for intensive processing capability in beam forming.

SUMMARY OF THE INVENTION

It is, therefore, the primary object of the present invention to provide an improved beam shaping antenna matrix for use in wireless cell towers that operates to accept signals from the antenna array and adaptively form antenna beams having desired (reconfigurable) attributes.

It is another object to allow an operator to sculpt the beams from an antenna array via mechanical connections at an unambiguous patch panel, without a large amount of hardware or any software.

These and other objects are herein accomplished by a beam shaping antenna matrix for use in wireless cell towers that facilitates a simple manual configuration procedure by a wireless operator based on selection of a desired beam size and point of direction, thereby adaptively forming antenna beams having the selected (and reconfigurable) attributes.

The present invention's design is simple and straightforward, highly effective, can be economically manufactured, and there is no equipment failure or downtime.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a wireless traffic matrix 2 incorporating a beam switching architecture suitable for use with a conventional wireless antenna system. The present beam switching architecture operates to accept signals from an antenna array and adaptively form antenna beams having desired (reconfigurable) attributes. The switching architecture allows a tower operator to easily reconfigure diversity coverage at a patch panel located in the tower base. The antenna matrix 2 is simple, easy to reconfigure, and relatively fault-free (in comparison to auto-switching diversity arrays.

Figure 1:
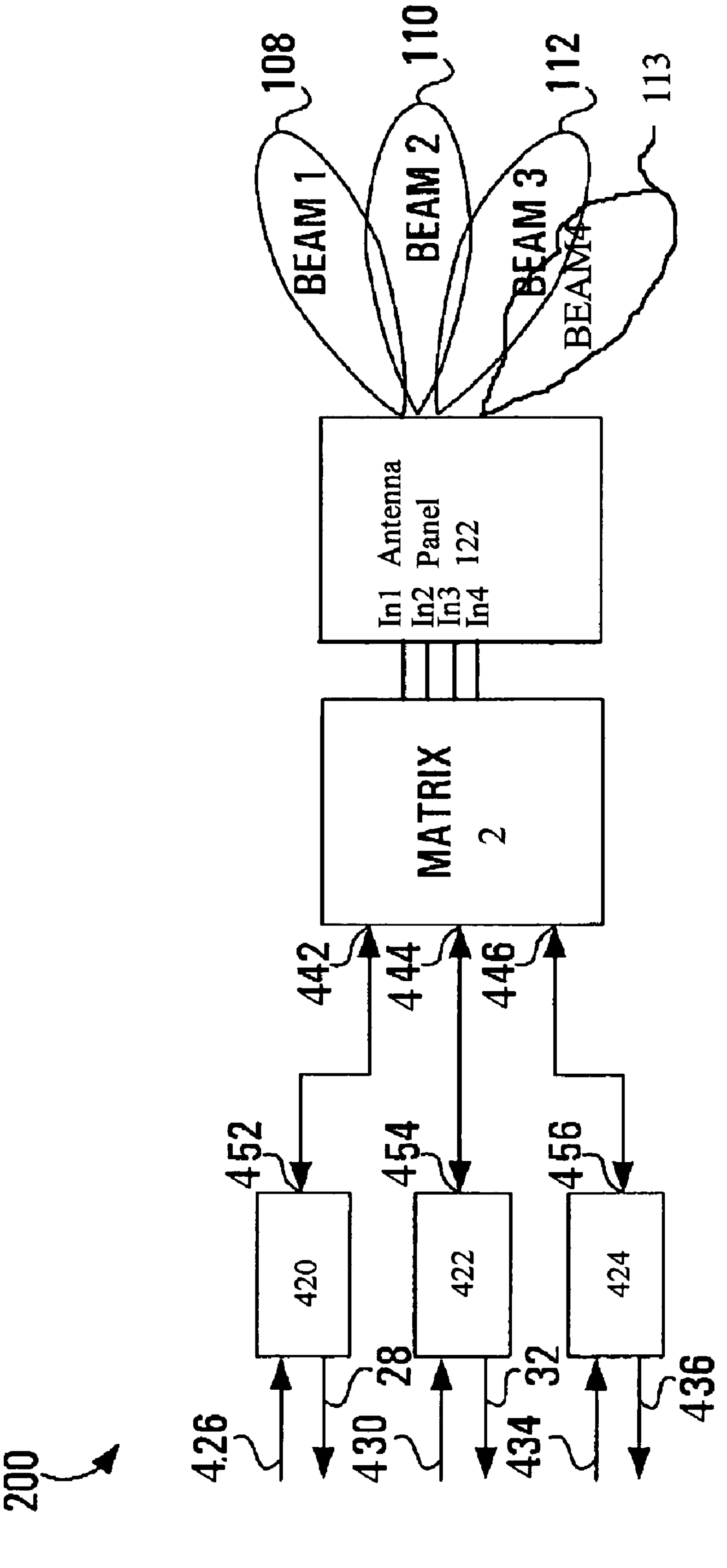
FIG. 1 shows a wireless antenna system covering an area with four beams by use of a wireless traffic matrix 2 according to the present invention.

To this end, FIG. 1 shows an otherwise conventional four-port antenna system 200 comprised of a single antenna panel 122 to cover an area with four beams inclusive of a first beam 108, second beam 110, third beam 112, and fourth beam 113 (there may be more or less beams as desired). Conventional wireless systems will employ any number of antenna panels each having any number of antenna elements to yield full 360 degree coverage. Here, the four beams 108, 110, 112, 113 are radiation/reception patterns formed by four antenna elements all incorporated in a single antenna panel 122. The four antenna elements are connected to the wireless traffic matrix 2 according to the present invention. The existing antenna system also comprises a first transceiver 420, a second transceiver 422 and third transceiver 424, all conventional components. The first transceiver 420 has input lines 426, output lines 428, and connections 452 to the traffic matrix 2. The second transceiver 422 has input lines 430, output lines 432, and connections 454 to the traffic matrix 2. The third transceiver 424 has input lines 434, output lines 436, and connections 456 to the traffic matrix 2. The wireless traffic matrix 2 provides a simple, easy to comprehend means for mechanically and electrically connecting the inputs/outputs of these transceivers 420-424 (or any other number) to the four antenna elements forming beams 108, 110, 112, 113 (or any other number of antenna elements) in antenna panel 122, thereby allowing an operator to adaptively form antenna beams having desired (reconfigurable) attributes.

Figure 2:
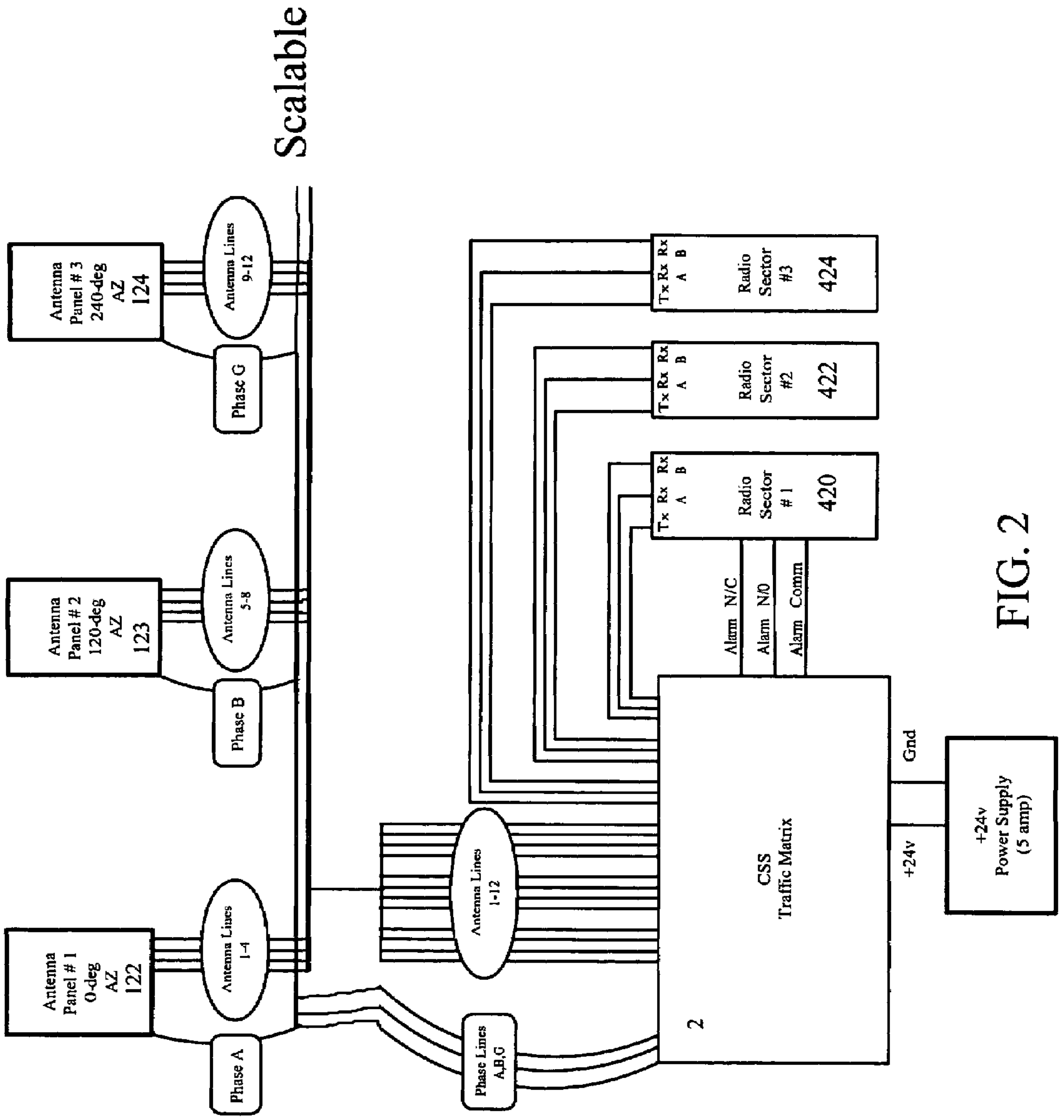
FIG. 2 is a more detailed system block diagram of the traffic matrix 2 of FIG. 1.

FIG. 2 is a more detailed system block diagram of the traffic matrix 2 according to the present invention shown in the context of an antenna system having three antenna panels (as shown in FIG. 1) each covering an area with four beams (again, there may be more or less antenna panels and/or beams as desired to yield 360 degree coverage). Specifically, FIG. 2 includes three antenna panels 122, 123, 124 at 0-120-240 degree orientations, respectively. Each of the three antenna panels 122, 123, 124 incorporate four antennas and hence are connected to the wireless traffic matrix 2 by four antenna lines and a phasing line. This results in a total of three phasing lines (A,B,G) and twelve antenna lines (1-12) connected to the traffic matrix 2 and available for patch panel connection to any one of three transceivers 420-424 (Radio Sector #1, #2 and #3), respectively. Each of the 12 antenna lines going to the twelve antennas at the top of the tower is a 3-phase connection, and all are length-calibrated coaxial cables to maintain exact relative phasing. The three transceivers 420-424 (Radio Sector #1, #2 and #3) are each existing transceivers having a transmit output Tx and two receive inputs Rxa and Rxb. Each transceiver 420-424 also has a series of conventional alarm inputs (here designated Alarm N/C, Alarm N/0, Alarm Comm) for failure notifications. All of the outputs Tx and inputs Rxa, Rxb, as well as the alarm inputs from transceivers 420-424 are connected to the wireless traffic matrix 2. The wireless traffic matrix 2 provides a simple, easy to comprehend manual patch-panel approach for mechanically and electrically connecting any of the transceivers 420-424 to any of the three antenna panels 122, 123, 124 to adaptively form antenna beams having defined and reconfigurable attributes. One skilled in the art should readily understand that the wireless traffic matrix 2 is scalable to accommodate more or fewer than three antenna panels, as well as transceivers, without departing from the basic architecture.

Figure 3:
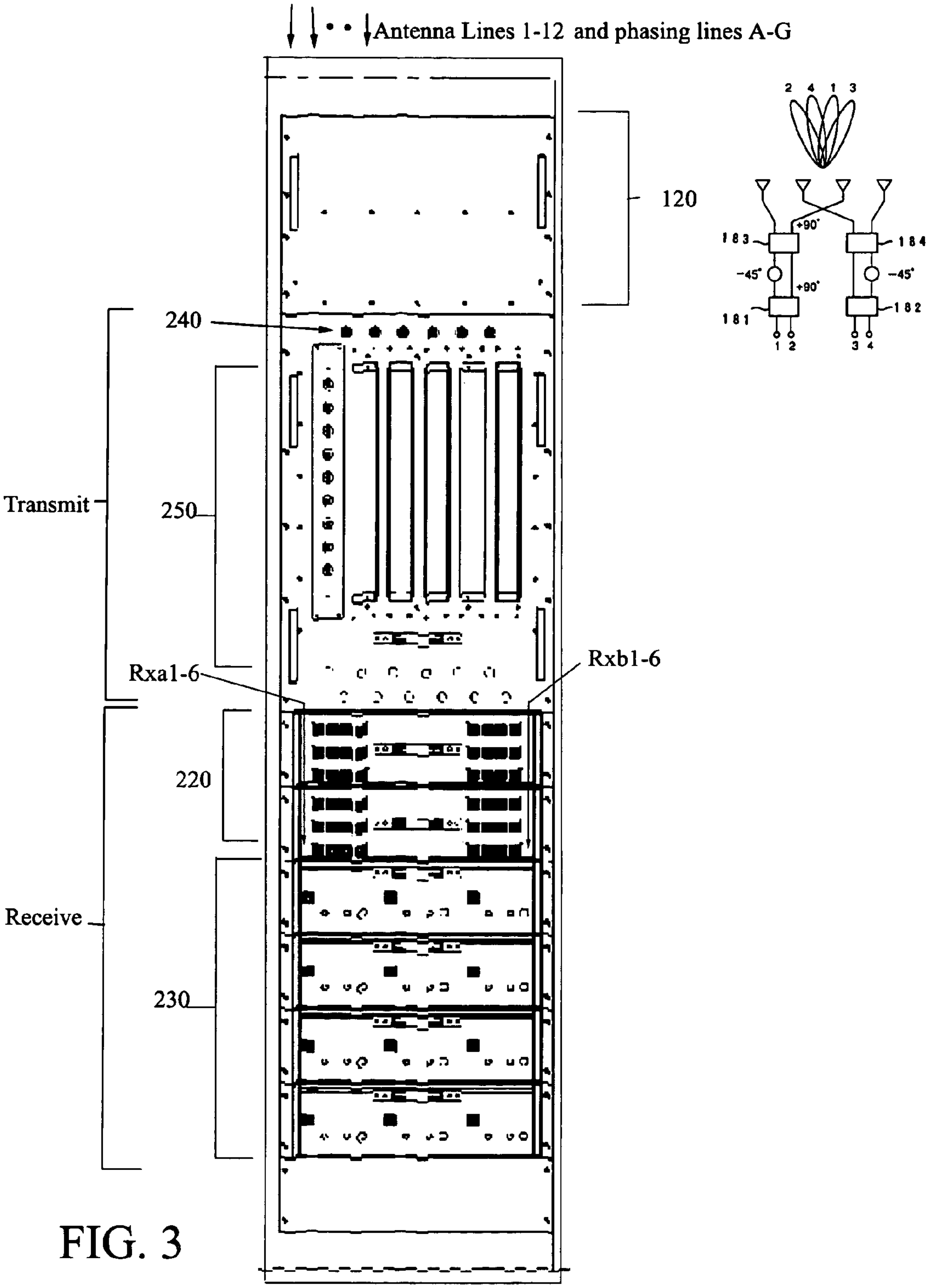
FIG. 3 is a front perspective view of the wireless traffic matrix 2 for balancing wireless traffic at an antenna station according to the present invention.

FIG. 3 is a front perspective view of the wireless traffic matrix 2 for balancing wireless traffic at an antenna station according to the present invention. The wireless traffic matrix 2 is typically located in the control room of a wireless tower for easy access by a wireless operator to mechanically and electrically connect any of the transceivers 420-424 to any of the twelve antennas in any of the three panels 122, 123, 124 using the calibrated coaxial cables, in order to adaptively form antenna beams having desired and reconfigurable attributes. The wireless traffic matrix 2 includes a rack-mount component cabinet that houses a series of modules 120, 250, 220, 230 each bearing an array of manual connectors exposed at the face of the traffic matrix 2. In the presently-preferred embodiment the connectors include both coaxial connectors for patch-panel cable-connection as well as personality modules for plug-in interconnection (as will be described). However, the general goal of allowing convenient beam sculpting by manual front-panel interconnections can also be accomplished with mechanical switches mounted on the traffic matrix 2 face. Specifically, all antenna lines 1-12 and phasing lines A, B, G from the antennas are routed into the top of the traffic matrix 2 to a conventional Butler Matrix 120 as shown in the inset to the right, and from Butler Matrix 120 down to the lower modules where they can be selectively connected (via mechanical direct coaxial-to-coaxial or by plug-in personality card connectors as will be described) to the transceivers 420-424, all at the face of traffic matrix 2. The Butler matrix 120 (inset) may be a digital or analog Butler Matrix to form multiple beams that can be manually or automatically steered for directional coverage. It is configured by hybrids 181-184 as is well known, and a description of the operation will not be provided.

The groupings of connectors and necessary connections will now be described, and it should be understood that the position of each group of connectors on the face of the traffic matrix 2 may be varied as desired. The face of the traffic matrix 2 is generally divided into a transmit portion and a receive portion, as labeled.

Figure 4:
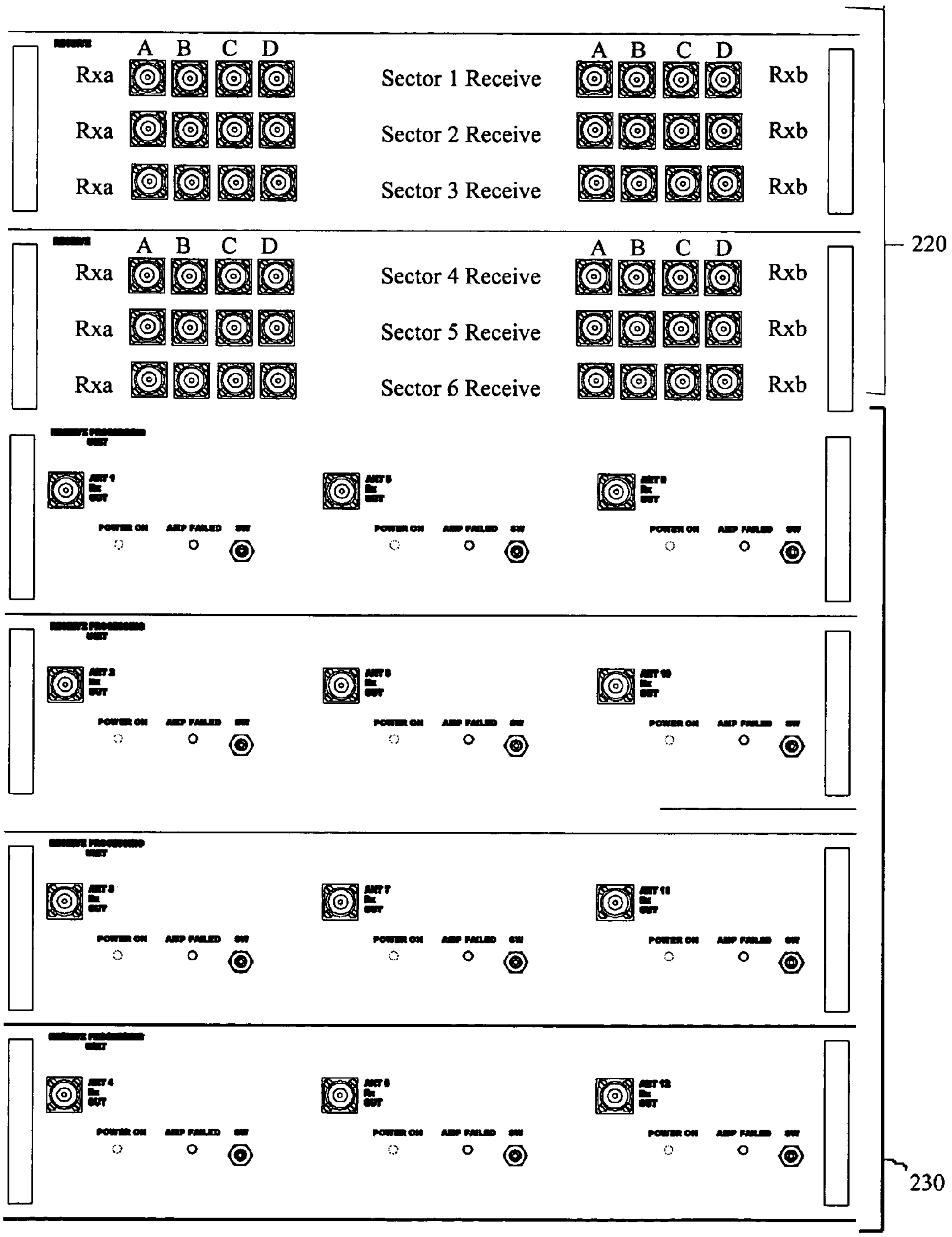
FIG. 4 is an enlarged view of the receive section of FIG. 3 including receive out connectors 220 and antenna receive out Rx out connectors 230.

FIG. 4 is an enlarged view of the receive portion including the sector receive connectors 220 at top. In the receive portion, three or six groups of sector receive connectors 220 are located beneath the transmit section 250 (six are shown), each group corresponding to a sector and comprising four groupings of coaxial receive connectors Rxa (a-d) & Rxb (a-d). The sector receive connectors 220 further comprise two sets of receive inputs for each sector, including four Rxa1-4 inputs for sector 1, four Rxb1-4 inputs for sector 1, four Rxa1-4 inputs for sector 2, four Rxb1-4 inputs for sector 2, four Rxa1-4 inputs for sector 3, four Rxb1-4 inputs for sector 3, four Rxa1-4 inputs for sector 4, four Rxb1-4 inputs for sector 4, four Rxa1-4 inputs for sector 5, four Rxb1-4 inputs for sector 5, four Rxa1-4 inputs for sector 6, and four Rxb1-4 inputs for sector 6. All four of the coaxial receive connectors Rxa (a-d) & Rxb (a-d) in each set are connected together by a 4-to-1 combiner 222 (see FIG. 5 described below) located behind the face of the matrix 2, and the resulting six receive lines Rxa, Rxb for sectors 1-6 are routed to the top of the traffic matrix 2 where they are connected as seen in FIG. 2 to the corresponding Rx outputs from the transceivers.

Also seen in FIG. 4 are the antenna receive out Rx out connectors 230 (see also FIG. 3) which are located beneath the sector receive connectors 220. There is one Rx out connector 230 for each antenna (twelve illustrated here), each Rx out connector being coupled (as will be described) through an amplifier/duplexer circuit 232 to a corresponding one of the twelve available antennas 1-12 in antenna panels 114, 116, 118. Each Rx out connector is available at the face of the matrix 2 for patch panel connection to the transceivers 420-424. The sector receive out connectors 230 further comprise an indicating LED for each antenna Rx out, and an activation toggle switch.

Figure 5:
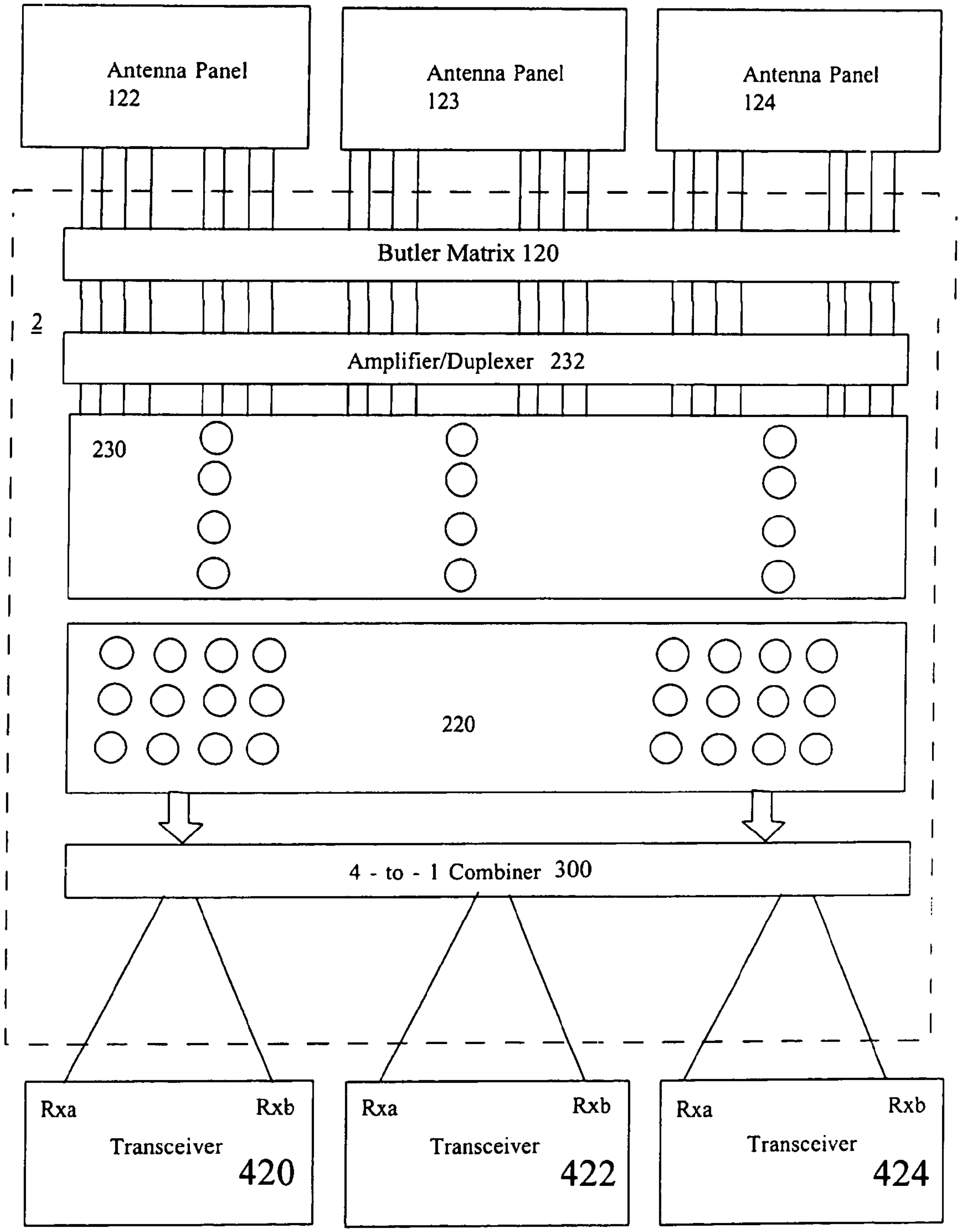
FIG. 5 is a block diagram of the antenna phasing reference connectors 210 and sector receive connectors 220 connected as necessary to configure the traffic matrix 2 for all antenna-to-transceiver receive connections.

FIG. 5 is a connection diagram showing the electrical connections between the antennas 1-12, Butler Matrix 120, Receive out "Rx out" connectors 230, sector receive connectors 220, 4:1 combiners 300, and transceiver 420-424 receive inputs Rxa & Rxb. The antennas 1-12 are connected to the Rx out connectors 230 at the face of the traffic matrix 2 through a duplexer and low noise amplifier 232. A variety of commercial parts will suffice here, for example, Powerwave Technologies sells a UMTS Amplifier/Filter unit which combines a high performance, multi-carrier power amplifier with a duplexer in a compact configuration demonstrating full 3GPP compliance over a 20 MHz instantaneous bandwidth. This effectively combines both duplexer and low noise amplifier in a single package 232.

The duplexer/low noise amplifier 232 is situated directly behind the Rx out connectors 230 behind the face of the traffic matrix 2.

Viewing the sector receive connectors 220 in FIG. 5, it should be apparent that the operator can, by connecting length-calibrated patch cords from the sector receive connectors 220 to corresponding Rx out connectors 230, selectively connect the antennas 1-12 to corresponding transceiver's 420-424 receive inputs Rxa & Rxb, thereby allowing manual sculpting of the beams from the transceiver's 420-424 as desired across the antennas 1-12 to accommodate demographic or other changes.

In addition to configuring the receive inputs, the operator must also configure the transmit Tx outputs for transceivers 420-424.

Figure 6:
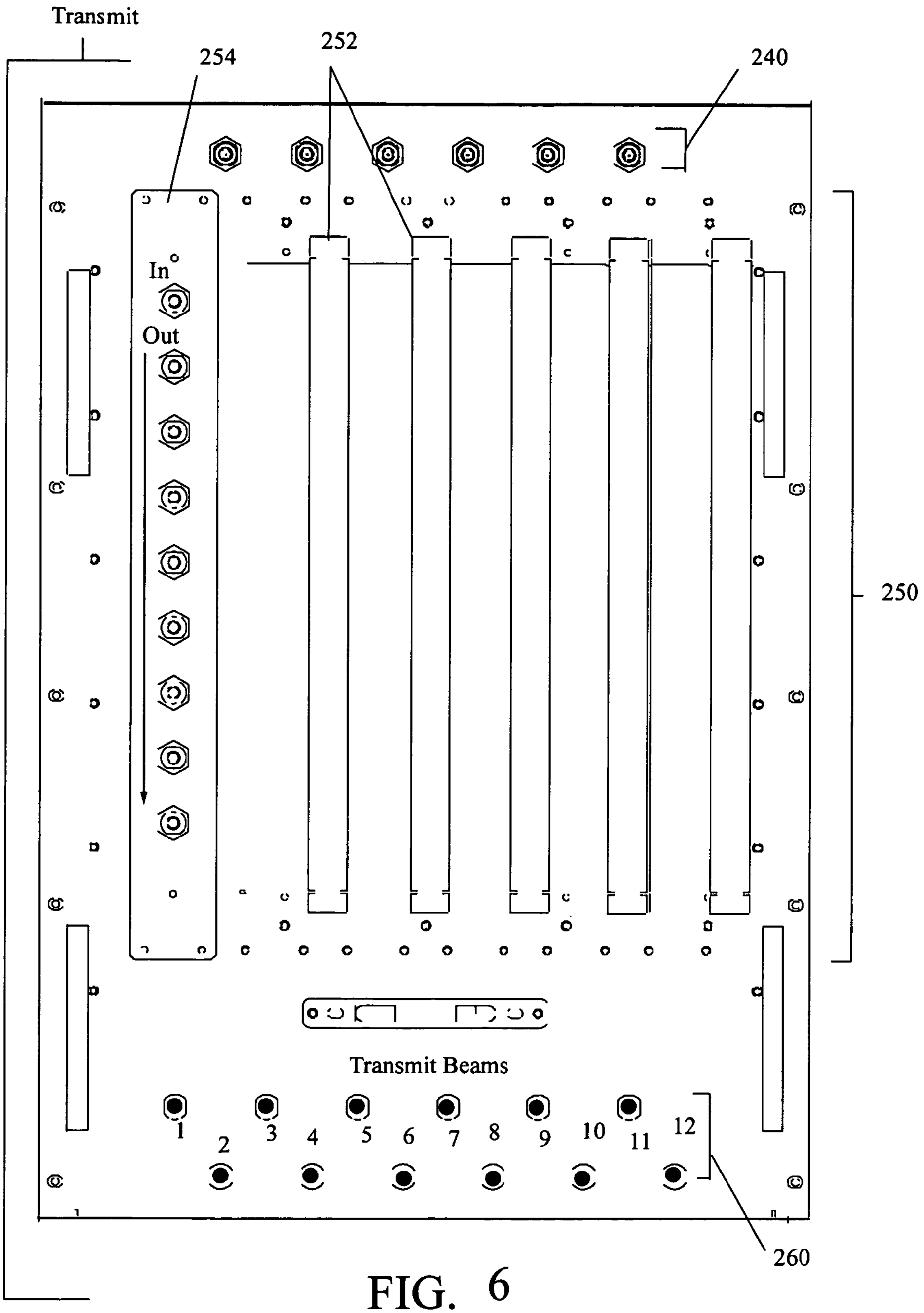
FIG. 6 is an enlarged view of the bottom portion of the traffic matrix 2 inclusive of transceiver panel 240, transmit beam former panel 250, and transmit antenna input jack panel 260.

FIG. 6 is an enlarged view of the bottom portion of the traffic matrix 2 inclusive of transceiver panel 240, transmit beam former panel 250, and transmit antenna input jack panel 260. With combined reference to FIGS. 2 and 6, the preferred configuration of the transmit portion will now be described. There is a transceiver panel 240 with a panel connector for each sector (here six sectors, although more or less can be employed). The panel connectors of the transceiver panel 240 are each connected (at the top of the Traffic Matrix cabinet 2) directly to a corresponding transmit input Tx of the transceivers 420-424, and bring the transmit inputs Tx out to the coaxial panel connectors of the transceiver panel 240. Directly beneath it lies a transmit beam former panel 250 with six open bays 252 each adapted to receive a personality module 254. Each personality module 254 has one input coaxial connector (topmost) which, once the module 254 has been inserted in its slot 252, is connected by calibrated coaxial cable to a corresponding panel connectors of the transceiver panel 240. Each personality module 254 also has as many output coaxial connectors (below the input) as desired, all hardwired within the module 254, to branch the transmit inputs Tx out to the antennas. The number of output coaxial connectors on each personality module 254 depends on the desired transmit Tx beam forming pattern and may vary depending on user requirements. The illustrated personality module 254 has eight output connectors corresponding to eight beams. Alternate personality modules 254 may be supplied with more or fewer output connectors corresponding to any number of desired transmit beams. Finally, directly beneath, is a transmit antenna input jack panel 260 with a panel jack for each of the twelve transmit antenna inputs 1-12. Each transmit antenna input 1-12 on jack panel 260 is an antenna input connected through the amplifier/duplexer 232 and butler matrix 120 to the transmit inputs of the antenna panels 1-3. Thus, one output coaxial connector on each personality module 254 is connected by calibrated coaxial cable to a transmit antenna input 1-12 on jack panel 260, effectively connecting each transmit input Tx of the transceivers 420-424 through amplifier/duplexer 232 and butler matrix 120 to the desired transmit inputs of the antenna panels 1-3.

Figure 7:
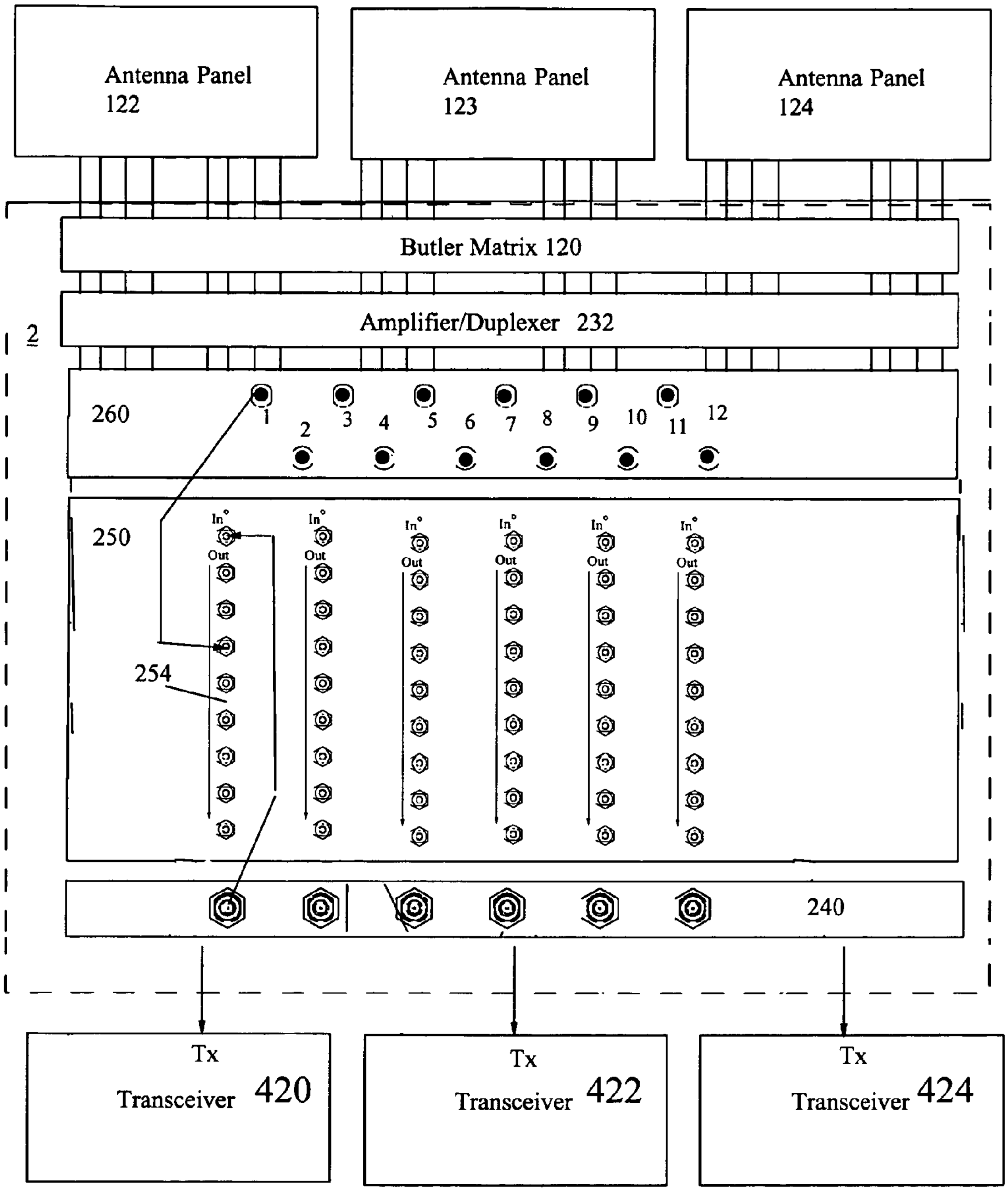
FIG. 7 is a block diagram of the transmit connectors of FIG. 6 and connections necessary to configure the traffic matrix 2 for all antenna-to-transceiver transmit connections.

FIG. 7 is a block diagram of the foregoing transmit connectors necessary to configure the traffic matrix 2 for all antenna-to-transceiver transmit connections. It should be apparent that the operator can, by connecting patch cords from the panel connectors for each sector (here six sectors) on the transceiver panel 240 with the connectors to each of the transmit inputs Tx to all of the transceivers 420-424 at the transmit beam former panel 250, selectively connect each of the transmit inputs Tx to all of the transceivers 420-424.

Thus, by simple connection of calibrated coaxial cables at the face of the matrix 2, an operator can configure twelve individual 30 degree beams that are formed at the wireless site, and to move these twelve separate sectors in 30 degree increments. Any number of beams can be assigned to any one transceiver, allowing the individual beams to be narrow or wide. There is no software, no signal processing, and no cumbersome hardware.

For example, to configure sector #1 for receive, each of the Rx out connectors 230 (FIG. 5) for all three antennas (1-3) in sector 1 must be connected to one of the sector receive connectors 220 (FIG. 5). Then, to configure sector #1 for transmit, each of the operator can connect patch cords from the panel connectors for each sector on the transceiver panel 240 (FIG. 7) with the connectors to each of the transmit inputs Tx to all of the transceivers 420-424 at the transceiver panel 250 to selectively connect each of the transmit inputs Tx to all of the transceivers 420-424.

It is especially important that all coaxial cables be phase matched (exact electrical lengths). It is also important to note that the operator need not configure all 12 antenna beams, as only 2 are required for minimal diversity, and even 1 is possible. In each case he can select the beams that he wants each sector to be, and the transceivers will always pick the better beam signal (for diversity). The foregoing traffic matrix 2 allows a wireless operator to sculpt and resculpt the beams to accommodate demographic or other changes preferably without a large amount of hardware or intensive processing capability.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

The invention claimed is:

1. A beam shaping antenna matrix for use in wireless cell towers having a plurality of antenna panels mounted on a tower and each incorporating at least one antenna, a Butler matrix, and antenna and phasing lines connecting each said antenna panel to said Butler matrix, and a plurality of transceivers located in a tower base and each having an output and two inputs, the antenna matrix comprising a patch panel located in said tower base and having manual connection means at the face thereof for electrically connecting said transceiver inputs and outputs to any of the plurality of antenna panels to adaptively form antenna beams having defined and reconfigurable attributes, said manual connection means being operable by an operator in said tower base from the face of said patch panel to sculpt the beams of said antenna panels to accommodate demographic or other changes.

2. The beam shaping antenna matrix of claim 1, wherein said manual connection means further comprise a plurality of panel-mounted coaxial connectors and a plurality of open slots and corresponding personality modules for insertion into said slots to sculpt the beams of said antenna panels to accommodate demographic or other changes.

3. A beam shaping antenna matrix for use in wireless cell towers having a plurality of antenna panels each incorporating at least one antenna mounted on a cell tower, a Butler matrix, and antenna and phasing lines connecting each said antenna panel to said Butler matrix, and a plurality of transceivers each having receive inputs and transmit outputs, said beam shaping matrix comprising:

a component cabinet located in a control room of a cell tower and housing a plurality of modules for facilitating manual operator-connection of said antennas to said transceivers, said modules further comprising a first type of module having a plurality of panel-mount coaxial connectors for patch-panel coaxial cable connection, and a second type of module having a plurality of open bays for insertion of corresponding personality modules for plug-in interconnection.

4. The beam shaping antenna matrix according to claim 3, wherein said modules are grouped at the face of said component cabinet into a receive area and transmit area.

5. The beam shaping antenna matrix according to claim 4, wherein the modules in said receive area bear a plurality of panel-mount sector receive connectors.

6. The beam shaping antenna matrix according to claim 5, wherein said sector receive connectors further comprise two sets of receive inputs for each antenna panel.

7. The beam shaping antenna matrix according to claim 5, wherein the modules in said receive area bear a plurality of panel-mount Rx out connectors for each antenna.

8. The beam shaping antenna matrix according to claim 7, comprising a single Rx out connector corresponding to each of said antenna panels.

9. The beam shaping antenna matrix according to claim 7, wherein said Rx out connectors are connected to said antenna panels through a duplexer and low noise amplifier.

10. The beam shaping antenna matrix according to claim 7, further comprising a plurality of length-calibrated patch cords for connecting the sector receive connectors to corresponding Rx out connectors in order to selectively connect the antennas to corresponding transceivers, thereby allowing manual sculpting of the beams from the transceiver's as desired across the antennas to accommodate demographic or other changes.

11. The beam shaping antenna matrix according to claim 4, wherein the transmit area comprises a transceiver panel having a panel-mounted coaxial panel connector for each antenna panel.

12. The beam shaping antenna matrix according to claim 11, further comprising a transmit beam former panel having a plurality of open bays each adapted to receive a corresponding personality module.

13. The beam shaping antenna matrix according to claim 12, wherein each personality module includes a plurality of output coaxial connectors to branch the transmit inputs Tx out to the antennas.

14. The beam shaping antenna matrix according to claim 11, wherein each personality module includes one input coaxial connector for connection by calibrated coaxial cable to a corresponding panel connector of the transceiver panel.

15. The beam shaping antenna matrix according to claim 14, wherein the transmit area allows simple assignment from the face of the matrix of any number of antennas to any one transceiver.

16. A method of beam shaping, comprising the steps of:

placing a manual connection matrix in the control room of a wireless towel for access by a wireless operator;

allowing said operator to selectively mechanically and electrically connect any transceiver in said tower to any of a plurality of antennas in any of a plurality of antenna panels using calibrated coaxial cables to adaptively form antenna beams having desired and reconfigurable attributes.

17. A method of beam shaping, comprising the steps of:

placing a manual connection matrix in the control room of a wireless tower for access by a wireless operator;

allowing said operator to mechanically and electrically connect any transceiver in said tower to any of a plurality of antennas in any of a plurality of antenna panels using plug-in personality modules to adaptively form antenna beams having desired and reconfigurable attributes.

* * * * *